United States Patent [19]

Riek et al.

[11] Patent Number: 5,054,066
[45] Date of Patent: Oct. 1, 1991

[54] ERROR CORRECTING PUBLIC KEY CRYPTOGRAPHIC METHOD AND PROGRAM

[75] Inventors: Justus Riek, Glen Cove; Gregory McFarland, Port Jefferson, both of N.Y.

[73] Assignee: Grumman Corporation, Bethpage, N.Y.

[21] Appl. No.: 272,502

[22] Filed: Nov. 16, 1988

[51] Int. Cl.$^5$ .............................................. H04L 9/30
[52] U.S. Cl. .......................................... 380/30; 380/50
[58] Field of Search .............................. 380/21, 30, 50

[56] References Cited

U.S. PATENT DOCUMENTS

| | | | |
|---|---|---|---|
| 4,165,444 | 8/1979 | Gordon | 380/50 |
| 4,200,770 | 4/1980 | Hellman et al. | 380/30 |
| 4,208,739 | 6/1980 | Lu et al. | 380/28 |
| 4,218,582 | 8/1980 | Hellman et al. | 380/30 |
| 4,306,111 | 12/1981 | Lu et al. | 380/30 |
| 4,351,982 | 9/1982 | Miller et al. | 380/30 |
| 4,417,338 | 11/1983 | Davida | 380/21 |
| 4,424,414 | 1/1984 | Hellman et al. | 380/30 |
| 4,514,592 | 4/1985 | Miyaguci | 380/30 |
| 4,841,570 | 6/1989 | Cooper | 380/30 |

OTHER PUBLICATIONS

McEliece, "A Public-Key Cryptosystem Based on Algebraic Coding Theory", by R. J. McEliece, DSN Progress Report 42-44.
Riek et al., "Public Key Encryption and Computer Communications Security in SDI Networks", Aug. 5, 6, 7, 1986.
Diffie et al., "Privacy and Authentication: An Introduction to Cryptography", vol. 67, No. 3, Me. 1979, pp. 397–427.
Diffie et al., "Multiuser Cryptographic Techniques", vol. 45, Jun. 3, 1976, pp. 109–112.
Diffie et al., "New DIrections in Cryptography", Nov. 1976, pp. 644–654.

*Primary Examiner*—Salvatore Cangialosi
*Attorney, Agent, or Firm*—Scully, Scott, Murphy & Presser

[57] ABSTRACT

The present invention relates to cryptographic systems, and particularly, public key cryptographic systems implemented in digital communication devices.

14 Claims, 5 Drawing Sheets

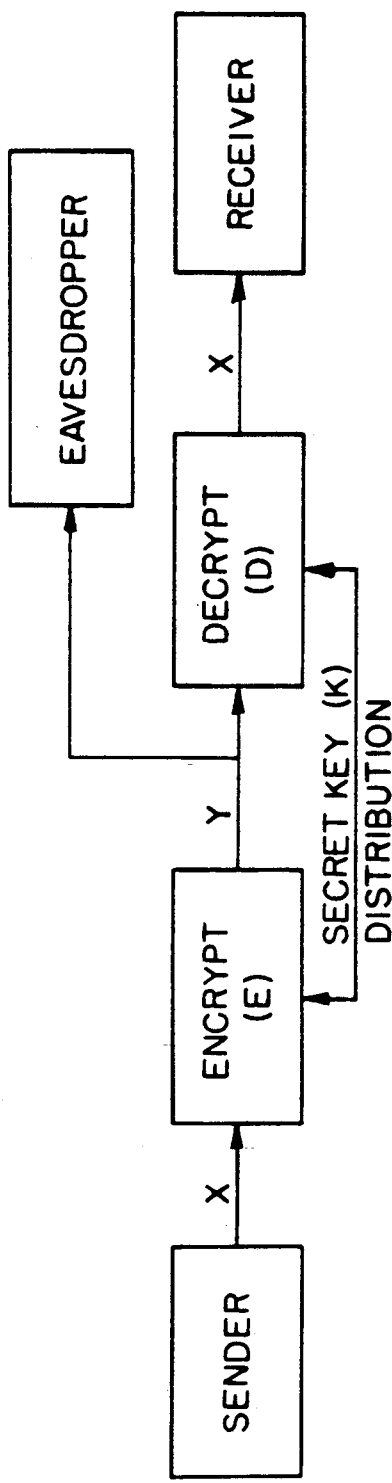
FIG. 1(a) PRIOR ART CONVENTIONAL CRYPTOGRAPHY PARADIGM
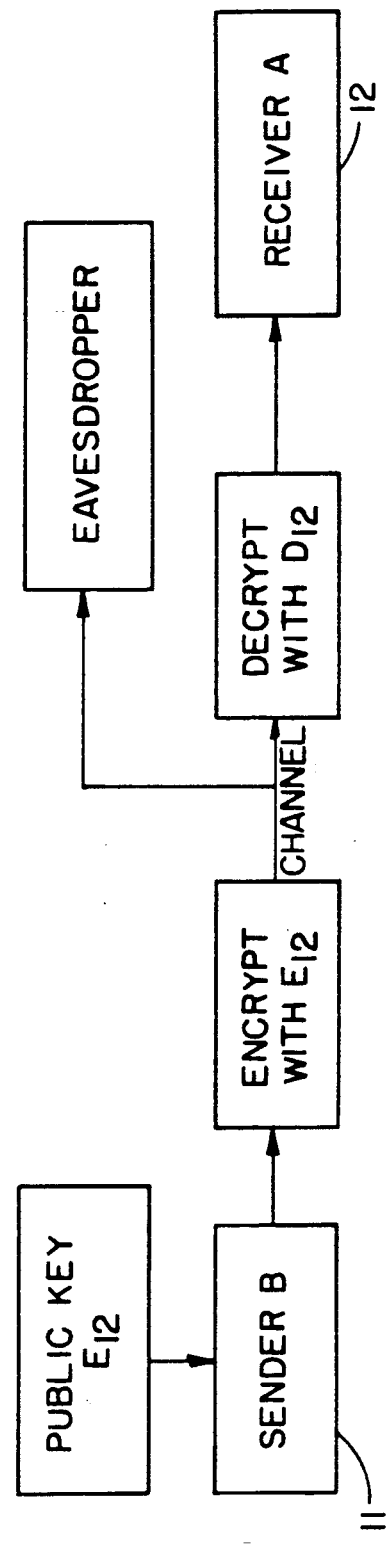
FIG. 1(b) PRIOR ART PUBLIC KEY CRYPTOGRAPH PARADIGM 5,054,066

ERROR CORRECTING PUBLIC KEY CRYPTOGRAPHIC METHOD AND PROGRAM

BACKGROUND OF THE INVENTION

Cryptographic systems are generally used when the sender wishes to insure the secrecy and authenticity of the messages to be sent. This is particularly true when the message is to be transmitted over a nonsecure channel, such as a radio or microwave communication link, which can be monitored at will by any adverse party.

The two requirements, secrecy and authenticity, are very different. For example, secrecy prevents the adverse party from deciphering the monitored or intercepted message to obtain the secret message, whereas authenticity assures the receiver of the message of the identity of the sender. For example, an airborne strike force needs a secure system to protect the secrecy of communications sent via radio or data link to the aircraft, and the aircraft needs to be able to authenticate the sender of the communication before responding thereto.

The two most significant developments of the past ten years in the field of cryptography have been the development of the data encryption standard (DES) and public key cryptography. The real significance of DES was not so much the algorithm itself, but the fact that a "standard" was established. DES is able to accommodate high data rates, in excess of ten million bps, but is dependent upon the distribution of an encryption key, which renders it susceptible to potentially fatal key distribution problems. That this is particularly true of covert operations wherein widely disbursed units, some of which may be in hostile territory, must be communicated with.

Public key cryptography has done much to obviate the key distribution problem. The two approaches that have received most attention are the RSA and Knapsack algorithms. A third approach proposed in the literature is the use of the linear Goppa code algorithm. The Knapsack algorithm, which was never commercially implemented, has recently been broken. The most popular system, the RSA algorithm, while it seems to be a strong shield for the data it protects, is extremely slow. The linear Goppa code algorithm possesses a high data rate, in excess of one million bps, and has been strongly indicated to be computationally secure.

The known public key encryption algorithms provide computationally secure encoding algorithms that can be read only by one who has generated and published the public key, or who has access to the decoding algorithm. However, public key systems, by their nature, do not provide simultaneous authentication.

A tutorial introduction to contemporary cryptography may be found in an article *Privacy and Authentication: An Introduction to Cryptography* by Diffie and Hellman, proceedings to the IEEE, Vol. 67, No. 3, Mar. 1979, Page 397-427.

U.S. Pat. No. 4,351,982 entitled RSA PUBLIC KEY DATA ENCRYPTION SYSTEM HAVING LARGE RANDOM PRIME NUMBER GENERATING MICROPROCESSOR OR THE LIKE, is representative of a number of patents which disclose and teach the use of an RSA Public Key algorithm for cryptographic systems.;

U.S. Pat. No. 4,218,582 entitled PUBLIC KEY CRYPTOGRAPHIC APPARATUS METHOD, is representative of a number of references which teach the use of the Knapsack algorithm in a public key cryptographic system.

The use of linear Goppa codes for a public key algorithm is taught in an article entitled "A Public-Key Crypto System Based on Algebraic Coding Theory", published by R.J. McEliece, DSN Progress Report 42-44, Jet Propulsion Lab, California Institute of Technology, Pasadena, California, January-February, 1978.

U.S. Pat. No. 4,417,338 entitled CRYPTOGRAPHIC KEY SHARING CIRCUIT AND METHOD USING CODE CORRECTION, teaches the use of encoding the encryption key into a code vector which is corrupted by combining it with an error vector to yield a 0 corrupted code vector. The corrupted code vector is corrected by a combination of an error correcting code and the use of at least K of the secondary keys.

Historically, the error vector was viewed as an impediment to the communication process. A "sender" would generate a binary message vector v and send it through a communications channel. What the "receiver" got at the other end was often not the original message v, but rather v+e, that is, the message corrupted by channel induced errors. The goal of error correcting codes was to discover the error vector e and remove its affect from the received vector r=v+e to obtain the original message v.

The book *Error Correcting Codes* by Petersen & Weldon, Jr., published by MIT Press, Cambridge, Massachusetts in 1972, provides an excellent summary of error correcting codes, particularly those intended for a digital communications environment.

SUMMARY OF THE INVENTION

It is an object of the present invention to provide a public key algorithm having the ability to provide data in a higher rate communications environment than is possible with other public key algorithms.

It is another object of the present invention to utilize the error correcting capability of Goppa codes to transmit a secondary or piggyback message.

It is another object of the invention to utilize the error correcting capability of Goppa codes to enable the transmission of computationally secure cryptograms over common carrier data links.

It is still another object of the invention to make use of a completely new class of error patterns, using preselected or "heavyweight error" patterns to provide secondary communications capability. Historically, the communications process has been concerned with "lightweight" error vectors, since a "maximum likelihood" of decoding identifies them as the most probable choices in the decoding process.

It is another object of the present invention to use linear binary multiple error correcting codes, in which error vectors are intentionally added to create cryptograms, to form a public key encryption system which provides a high degree of security.

Another object of the present invention is to use an encryption process in which the error correction capability of the associated error correcting code is used simultaneously to intentionally obscure or further encrypt sensitive information, and to correct errors which may be caused by the communications channel.

It is another object of the present invention to use an encryption process in which the error patterns, because they are intentionally chosen, may be associated with information which is transmitted by specialized bit patterns which comprise the error pattern vector.

It is another object of the present invention to use an encryption process in which the error patterns, because they are intentionally chosen, may correspond to any correctable heavyweight, that is, normally nonselected error pattern.

It is a further object of the present invention to provide a method of transmitting a cryptogram over a communications channel by means of a public key algorithm, wherein said method comprises a series of sequential steps, the first step being the construction of a first generator matrix associated with a preselected finite field and an irreducible degree s Goppa polynomial, said generator matrix defining an s error correcting code capability. After the first generator matrix is constructed, a scrambled generator matrix is constructed by matrix multiplication wherein said scrambled generator matrix is the product of a nonsingular matrix, said first generator matrix, and a permutation matrix. This scrambled generator matrix defines an equivalent s error correcting code. After the scrambled generator matrix is constructed, the message to be sent is converted to blocked binary form wherein the size of the block form corresponds to the number of rows in the scramble generator matrix. After the message has been blocked, it is encoded with the scrambled generator matrix by using matrix multiplication to form a code vector. After the code vector has been derived, a preselected error vector is added in component wise fashion using modular two arithmetic to generate a cryptogram. The cryptogram is then transmitted over a communications channel wherein the anticipated channel errors combined with the weight of the preselected error vector do not exceed the degree s error correcting capability of the selected Goppa code.

BRIEF DESCRIPTION OF THE DRAWINGS

FIG. 1(a) is a paradigm of a conventional prior art encryption scheme using a secret key known only to sender and receiver.

FIG. 1(b) is a paradigm of a prior art public key encryption system.

DETAILED DESCRIPTION OF THE PREFERRED EMBODIMENT

Figure 2:
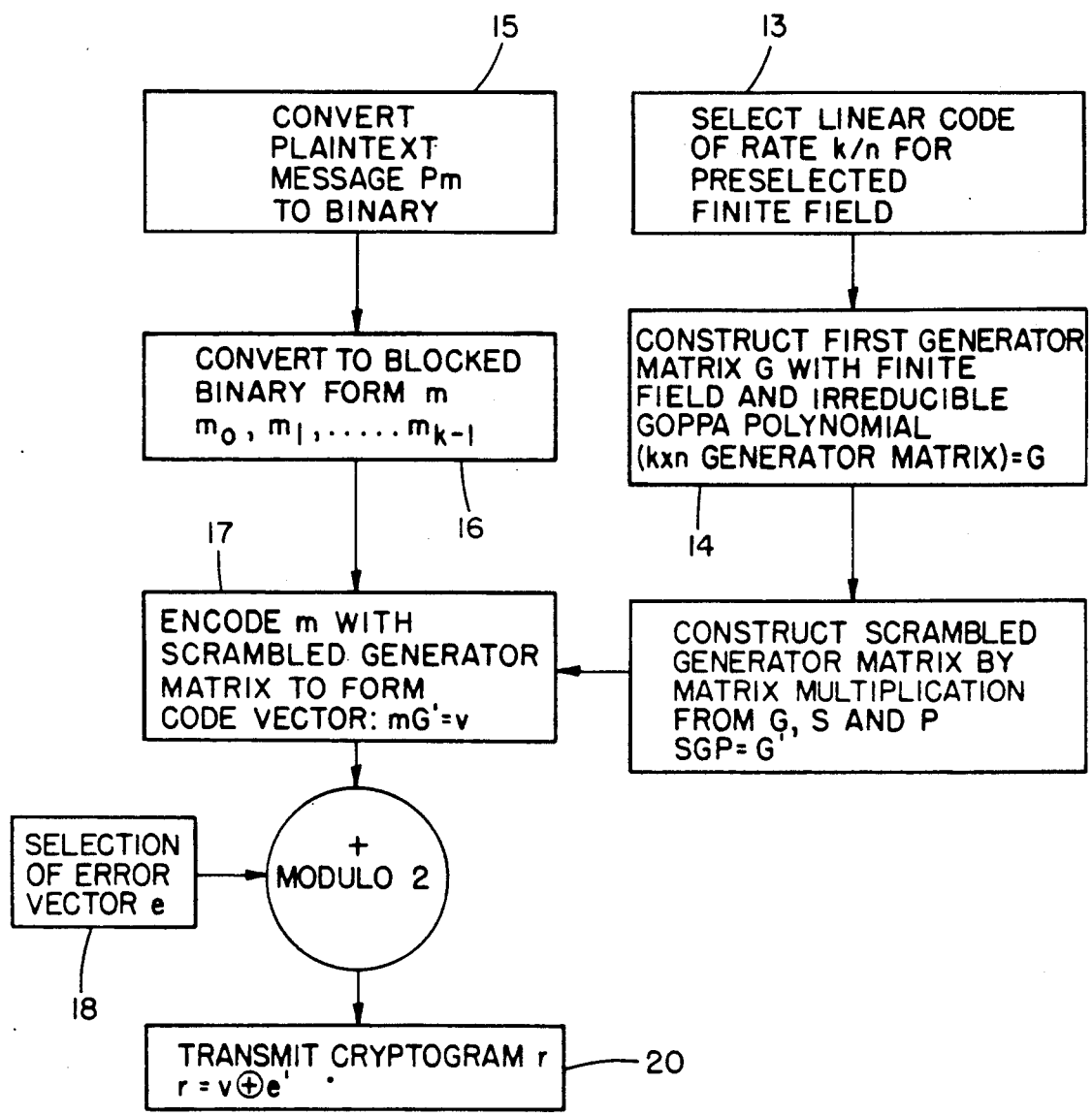
FIG. 2 is a block diagram of a public key encoding and encryption program utilizing the present invention.

The generic components of a conventional encryption scheme, as illustrated in FIG. 1(a), includes an encryption algorithm E, a decryption algorithm D, and a key K, all of which interact to transform plaintext (X) into ciphertext (Y), and then back again. Symbolically one writes $Ek(X) = Y$ $Dk(Y) = X$ Both sender and receiver must possess a copy of the key (invariably a sequence of numbers). From a logical point of view, knowledge of the function E and the key K will permit one to decrypt (as well as encrypt). Similarly, knowledge of D and K will permit one to encrypt (as well as decrypt). Both sender and receiver have an equal understanding of both processes involved. With the passage of time, it is conservatively assumed that knowledge of the encryption scheme will become known, even to unauthorized personnel. For example, unauthorized personnel (eavesdroppers) will find out what sort of algorithm has been implemented. What they will not learn (hopefully) is the specific key which is in use at any one time. Thus, the active key in use at any given moment is truly the "key" to the system. This is the reason for the great need to protect keys in a conventional encryption system.

Such is not the case with public key systems. In a public key scheme, two algorithms are used which are strongly separated: one to encrypt and one to decrypt. The encryption algorithm E is made public, while the parameters which define the decryption algorithm D are kept secret by the originator of the system. The important aspect of the system is that even given the public knowledge of E, it is computationally difficult to derive D. There is no "encryption key" as used above in the conventional scheme. Thus E can be made public without compromising D. Assuming for the moment that such functions exist, consider the prior art encryption paradigm shown in FIG. 1(b). Assume that sender B, illustrated at 11 wishes to transmit secretly to receiver A, illustrated at 12 who has established a public key system. Label the algorithm with a subscript $E_{12}$ to indicate ownership, not a key. The difference between this diagram and the preceding description of conventional cryptography is the missing key distribution requirement. Sender 11 encrypts using receiver 12's public algorithm $E_{12}$ Transmission may now occur in any chosen manner, since only receiver 12 will be able to properly decrypt the ciphertext. The system is intrinsically more secure, since $D_{12}$ never leaves the possession of receiver 12. There is no dissemination of keys which must be kept secret. If sender 11 were to set up a similar type of scheme using different algorithms $E_{11}$ and $D_{11}$, where $E_{11}$ is made public and $D_{11}$ kept secret, then a two-way conversation may follow. However, it should be noted that since the public key algorithms are public, secrecy will be preserved, but authenticity will not be assured, since a third party could use 11's public key and claim that he/she was 11.

To date, there have been two public key approaches which have received a great deal of technical attention. They are the Knapsack and RSA algorithms. The Knapsack algorithm is based upon a famous combinatorial problem which can be briefly summarized as follows. Given a knapsack and a collection of cans of various sizes, determine what combination of cans is required to exactly fill the knapsack. The encryption scheme based upon this problem was recently broken. The RSA algorithm is based upon the difficulty of factoring large integers. There are several comments to be made regarding the RSA scheme. Recent progress in the applications of elliptic functions has raised questions regarding the strength of the algorithm. Second, the application of networks of microprocessors to perform parallel processing has produced somequite rapid factoring of large numbers. In addition, the RSA algorithm, because of the nature of its internal arithmetic, is relatively slow (on the order of 5,000 bps). These developments have caused researchers to begin investigating alternative approaches to public key encryption implementation.

ERROR CORRECTING CODES

Information theory, of which the theory of error correcting codes is a subset, was discovered by C. Shannon in the late 1940's. One of its major results is a theorem which states that so long as one does not exceed the capacity of the communications channel, it is possible to encode/decode information in such a way as to achieve arbitrarily small error rates. During the 40 years since this discovery, significant effort has been expended searching for the codes promised by this famous existence theorem. While ultimate success has not been achieved, the work has produced some very good codes and, even more importantly, some very fast encoding/decoding algorithms.

In order to explain the basic workings of the encryption algorithm under consideration, the reader must possess a minimal understanding of error correcting codes. The following is a brief summary of the required elements. The book *Error Correcting Codes,* by Peterson and Weldon, Jr. published by MIT Press, Cambridge, Mass. in 1972 contains an excellent summary of error correction theory.

For a given $n \geq 0$, the set of binary n-tuples, together with the operations of modulo 2 vector addition and scalar multiplication by elements of GF(2), is an n-dimensional vector space. A subset, V, of this vector space is a linear code if it is a subspace of the vector space. Any set of basis vectors of the code V can be regarded as the rows of a matrix G, called the generator matrix. Each element in V can be expressed as a linear combination of the rows of G. If the dimension of the code (subspace) V is k, then G has k rows and V contains $2^k$ code words or vectors. Such a code is called an (n,k) binary linear code of rate k/n.

To develop useful results, it is frequently necessary to have a unit of measure. Let $u \in V$ be a code word. The Hamming weight of u, w(u), is defined to be the number of non-zero components of u. Let $u, v \in V$ be code words. The Hamming distance between u and v, d(u,v), is defined to be the number of components in which the two code words differ Hamming distance is a metric. The distance structure of a code is directly related to its error correcting capability. For some positive integer t, the code is a t-error correcting code if the distance between any two code words is at least $d = 2t + 1$. The minimum distance of a code is defined to be $$d_{min} = \min_{\substack{u, v \in V \\ u \neq v}} d(u, v)$$

But since the code is linear, the following is true $$d(u,v) = d(u-v, o) = w(u-v)$$

and the problem of finding the minimum distance of a code is reduced to finding the minimum weight of the non-zero words.

FIG. 2 illustrates, in block diagram form, a public key encoding and encryption program utilizing an error correcting code, wherein the correcting capability of the code is used to corrupt information in the code word, and create a cryptogram. In the embodiment illustrated in FIG. 2, linear codes, and in particular, Goppa codes determined by irreducible polynomials are used.

When a message is encoded according to the present invention, the plaintext message m is first converted to binary form as indicated in functional step 15 in FIG. 2. The binary message is then formulated in blocks of k bits, $m = (m_0, m_1, ... m_{k-1})$ as indicated at 16. Next, a code vector v is formed by multiplying the blocked message by the scrambled generator, matrix G', using matrix multiplication, $m G' = v$, illustrated at functional step 17.

However, if encryption is desired, an error vector is added at step 18

$$v + e = r.$$

The code vector v is encrypted according to the present invention by adding an error vector e to v, using modulo 2 addition.

The received word r thus includes intentional errors, $$r = (r_0, r_1 ... r_{n-1}) = (v_0, v_1 ... m \ v_{n-1}) + (e_0, e_1 ... e_{n-1} = v + e.$$

It is assumed, based on the previous choice of t, that the error vector e satisfies $w(e) \leq t$. Since the code has a minimum distance $d_{min} = 2t + 1$, the received word r is closer to v than any other code word and one can successfully decode at the receive end of the communication channel. Thus if at most t errors occur, it is always possible for the originator of the scrambled matrix G' to recover the original code word and plaintext message transmitted.

Decryption

Figure 3:
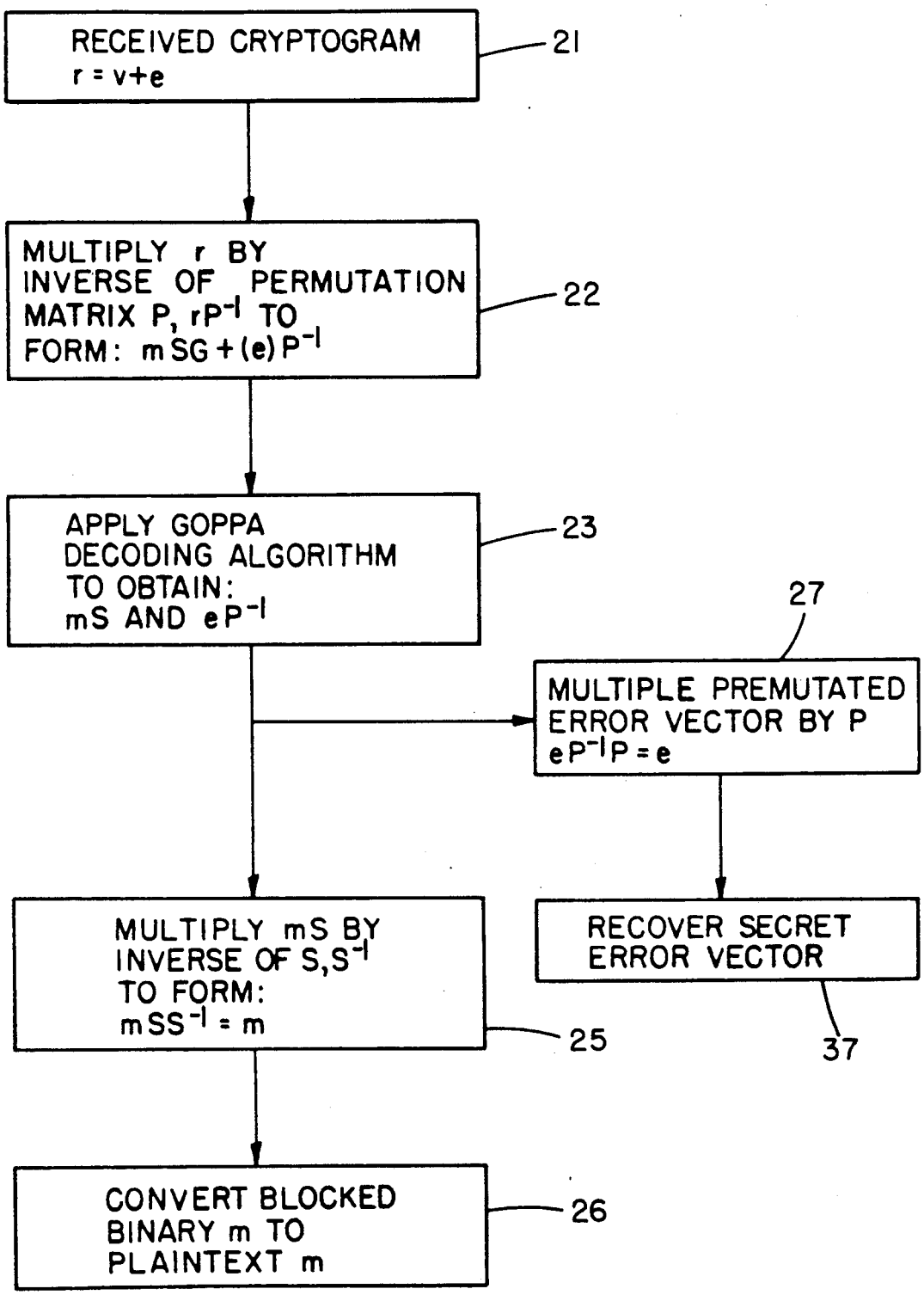
FIG. 3 is a block diagram of a public key decoding and decryption program utilizing the present invention.

FIG. 3 illustrated how the holder of the scrambled generator matrix G' decrypts the received cryptogram r.

The received cryptogram $r = v + e$, indicated at 21 in FIG. 3 is first multiplied by the inverse of the secret permutation matrix P (used to form G') $rP^{-1}$ to form:

$$\begin{aligned} rP^{-1} &= (mG' + e)P^{-1} \\ &= (mSGP + e)P^{-1} \\ &= mSG + eP^{-1}. \end{aligned}$$

The Goppa decoding algorithm is then applied, as indicated at 23 in FIG. 3 to find mS, a word in the Goppa code. The decoding algorithm thus yields mS, and an error vector $eP^{-1}$. Then mS is multiplied by the inverse of S, $S^{-1}$ to form:

$$mS \ S^{-1} = m$$

as indicated at 25 in FIG. 3. When m is recovered, it may then be unblocked and translated from binary to the plaintext message m.

The error vector $eP^{-1}$ may also be recovered from the Goppa decoding algorithm as indicated at 27 in FIG. 3, by multiplying ($eP^{-1}$) by the permutation matrix to yield e.

There are three (3) points to be made regarding the error vector e, at 18 in FIG. 2.

1. Since the decrypting process is actually a disguised error decoding process, the decryption may take place successfully as long as the number of errors in e does not exceed t. The sender may corrupt the code word v with only a portion of the t error bits, and permit the communication channel to (possibly) insert additional random errors up to the total number t. If the combined total of intentional and channel errors does not exceed t, successful decryption will result. This ability to both encrypt and tolerate communication channel errors is unique to this invention.

2. Since e is chosen by the sender, the contents of e may be made to correspond to a secondary message. This e is recoverable at the receive location, and thus the secondary message contained therein is also recoverable. This process has the effect of increasing the amount of information contained in $r = v + e$ during the transmission process. If the error vector e is used to carry a secondary message, then it must be safeguarded from the insertion of communication channel errors (for example by separately protecting e with an error correcting code scheme). In particular, the contents of this secondary message contained in e may be made to correspond to authentication information unique to the sender.

3. Since the error vector e is chosen by the sender, additional error patterns other than those considered in classical error control processes may be utilized, Any correctable error pattern may be used which is capable of correction at the receive end of the communication channel. For example, classical communication theory assumes the presence of "light weight errors" which result from the application of maximum likelihood decoding assumptions. As described in *Error Correcting Codes* supra, there are other non-standard correctable error patterns which are not represened by patterns of minimum weight. An equally applicable set of "heavy weight" error vectors may be used where each heavy weight error (e') corresponds to the compliment of a light weight error vector (e) by $$e = e + 1 = (e_0, e_1, ..., e_{n-1}) + (1, 1, ..., 1),$$

the addition of the all-ones-vector. The expansion of the set of error patterns which may be used in the information corruption process causes an additional burden for the eavesdropper attempting to read the encrypted communication traffic.

Figure 4:
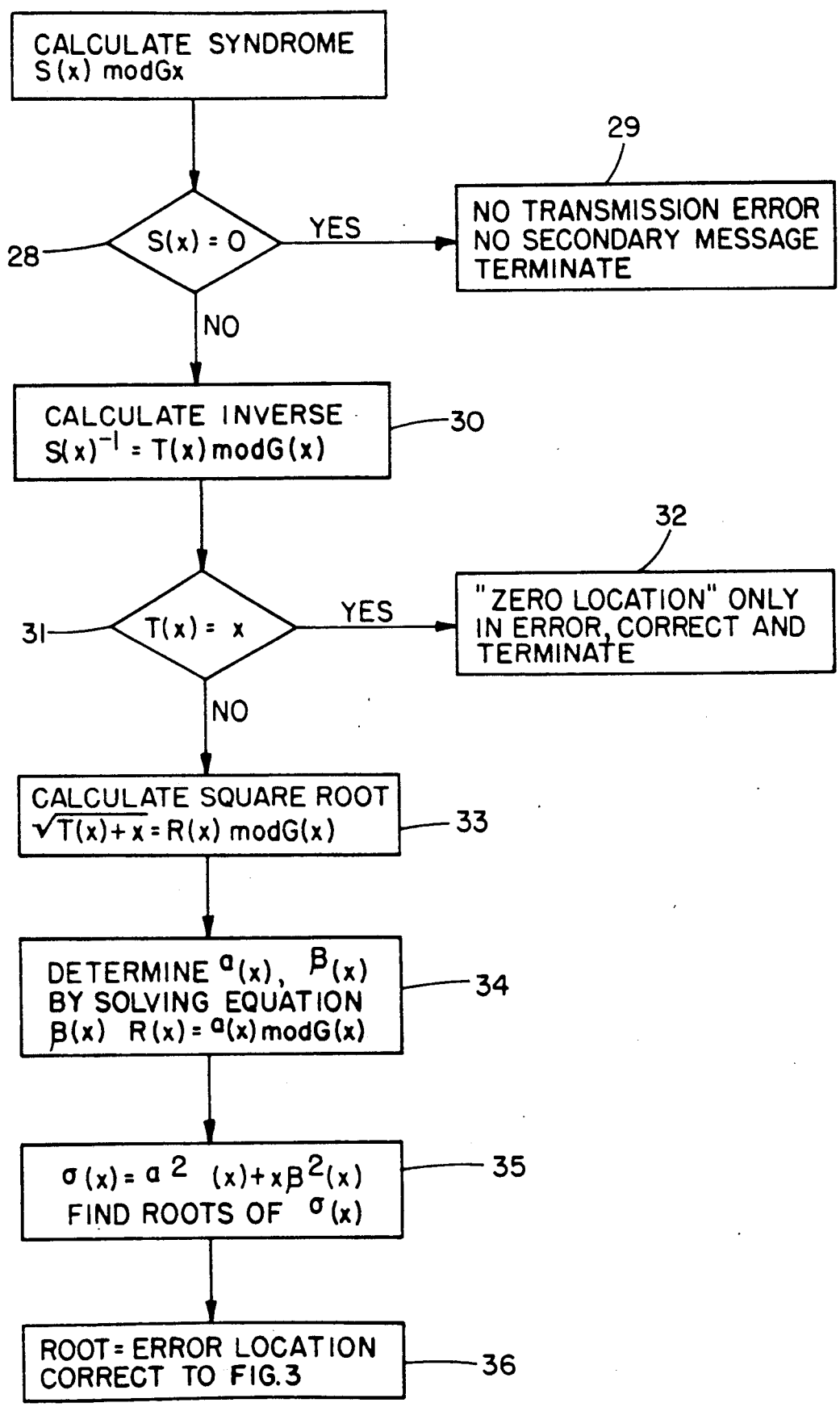
FIG. 4 is a diagrammatic flow chart of a part of the computer program illustrated in FIG. 3, illustrating the application of the Goppa decoding algorithm to the present invention.

The application of the Goppa Decoding Algorithm to the present invention, illustrated at 23 in FIG. 3 is more fully illustrated in the functional flow chart of FIG. 4, and described in detail in the attached Exhibit A Exhibit A is a source listing of programs written in the Ada program language to demonstrate the present invention. The Ada language was selected in response to a desire on the part of the Department of Defense to standardize on one language While the program was written in Ada as a demonstration vehicle, it should be understood that many different languages could be used for this purpose Exhibit A is a compilation of the major mathematical software needed to implement the present invention.

Exhibit A provides data structures for messages and codewords and routines to encrypt messages into codewords and to decrypt encrypted codewords back to messages. It also provides routines for encoding and decoding with no encryption. The decoding algorithm used can correct up to S errors per codeword were S is the degree of the Goppa Polynomial.

Details of the algorithms used are documented in each of the following package bodies and their subunits.

"Generic package Goppa_S_Crypt" This package implements the Public Key Encryption Algorithm using the Goppa Error Correcting Code. The "Public Key" is a transformation of the Goppa Code Generator matrix that can be used to generate codewords in the code. This transformation G' is obtained by the matrix multiplications G' = SGP. However, knowledge of the public key does not enable one to decode the generated codewords without knowledge of the original generator matrix and/or the S and P matrices, all of which are kept secret. Thus even stations that encrypt cannot decrypt without the secret key, and the public key can be freely distributed without loss of security to the system.

In operation this package, and generic packages Generator, Goppa_Syndrome, Finite_Field_Euclids, and Square_Root_Mod_Goppa are instantiated, and the following constants, types and functions are provided:

A natural constant Degree_Of_Goppa_Poly that holds the degree of the Goppa polynomial.

An instantiation of the Generator package, which provides a Generator Matrix, a Parity Check Matrix, a Column Restored Generator Matrix whose columns have been restored to proper positions for decoding of codewords generated from this matrix. Also provided is the length of messages for the code, Information_Length.

A subtype Message that represents binary messages.

A subtype Codeword that represents binary words of the code.

A function Encode that accepts a Message and returns the Codeword for that message. The codeword is by default ready for decoding, i.e., bit positions are arranged for the decoder and may not be in systematic form. The user may choose to get the codeword in systematic form, but in a form where the decoder may fail by setting the optional parameter Fix_Cols to False.

A function DECODE that accepts a Codeword with an unknown number of errors, and returns a corrected codeword in the Goppa Code. If more than S errors are present, the decoding will fail and exception Exceeded_Error_Correction_Cap will be raised. If the optional debug parameter is set to true, the vectors and polynomials obtained during the calculations are printed to the standard output, and exceptions raised by decoder failure are noted and handled locally.

A function Systematic_Form that accepts a codeword (that may or may not contain errors) and converts it to systematic form, i.e., the information bits are isolated in one part of the codeword. The information bits will be in positions Codeword_Length - Information_Length, i.e., the last Information_Length bits. This function is included for use in interactive experimentation. It should not be used as part of the decoding process, since function Recover_Message will extract the information bits from a codeword in a more efficient manner.

A function Recover_Message that accepts a Codeword that has not been put in systematic form and returns a Message containing the information bits of the codeword in their proper order. This function is intended to be used after decoding a codeword.

A function Encrypt that accepts a binary message and returns a codeword encrypted via the public key. The optional parameter Debug toggles the debugging mode.

A function Decrypt that accepts an encrypted binary codeword and returns the original unencrypted message. The optional parameter debug toggles the debugging mode. Note that the Decrypt function must accept binary vectors created by the Encrypt function. Unencrypted binary vectors produced by the Encode function will not be correctly decoded here.

An exception Exceeded_Error_Correction_Cap that is raised when the decoder fails to decode an input codeword. This may occur when there are more that S errors in the input, or when some unexpected internal error occurs.

The instantiation of the package requires the following inputs

Finite Field Inputs, a private type coefficient that will provide a data structure to represent the coefficients of each term of the polynomial (i.e., a finite field element). Polynomials will also evaluate to objects of this type. Coefficients must be Field_Elements from the instantiation of package Finite_Field.

A natural Coeff_Binary_Form_Length that is the length of a coefficient's binary representation. A coefficient that does not have such a form cannot be used to create a generator matrix and thus cannot be used to instantiate this package.

The zero of the finite field of coefficients, Zero_Coeff.

The unit of the finite field of coefficients, Unit_Coeff.

A function Get_Coeff$_{13}$ Binary_Form that accepts a coefficient and returns that coefficient's binary form of type Binary_Polynomials_Poly.

A function Invert_Coeff that accepts a coefficient and returns its inverse in the finite field.

A function Add_Coeffs that accepts two coefficients and returns their field arithmetic sum as a coefficient.

A function Multiply_Coeffs that accepts two coefficients and returns their field arithmetic product as a coefficient.

A function Alpha_To_Power that accepts a natural number representing the desired power of field primitive alpha and returns the corresponding coefficient.

A function Coeff_To_Power that accepts a coefficient (field element) and a natural power and returns the coefficient exponentiated to that power as a coefficient (element in the finite field).

A function SQRT_Of_Coeff that accepts a coefficient and returns its square root in the finite field.

A procedure Print_Coeff that prints a field element to the standard output. Used to print out the matrix. Polynomial Inputs A range Degreetype that provides the range of valid degrees of terms of polynomials of type Polytype.

A private type Polytype that will provide a data structure for polynomials. Polytype must be of type Poly from the instantiation of package General_Polynomials. Coefficients of these polynomials are field elements from Finite_Field.

The Zero_Poly, the polynomial of degree zero whose coefficient is the zero coefficient.

The Unit_Poly, the polynomial of degree zero whose coefficient is the unit coefficient.

A function Evaluate_Poly that accepts a polynomial and a coefficient, and returns the value of the polynomial when evaluated at that coefficient. The result is returned as type coefficient.

A function of Build_Poly that accepts a polynomial, a natural number indicating a term in that polynomial, and the new coefficient to be inserted at that term. Returns the input polynomial with the new coefficient at the desired term.

A function Add_Polys that accepts two polynomials and returns their sum.

A function Subtract_Polys that accepts two polynomials and returns their difference.

A function Multiply_Polys that accepts two polynomials and returns their product.

A procedure Divide_Polys that accepts two polynomials and returns (via "out" parameters) their quotient and remainder.

A function Degree_Of_Poly that accepts a polynomial and returns its degree as type Degreetype.

A function "<" that compares two polynomials and returns True if the left polynomial is less than the right polynomial and returns False otherwise.

A function Coeff_Of_Poly that accepts a polynomial and a degree of a polynomial term of type Natural, and returns the coefficient of the polynomial term at the specified degree.

A procedure Print_Poly that prints a polynomial of type Polytype to the standard output file.

A polynomial Goppa_Poly of type polytype that represents the Goppa Polynomial for this code.

Other Inputs

A constant Codeword_Length that specifies the length of codewords for this code.

A function Make_Matrix that accepts a value Matrix_Size of type natural and returns a "scrambled" binary matrix to be used for the encryption/decryption process. This matrix must be invertible or the algorithm will fail and the user supplying this function is responsible for this. A boolean parameter Col_Permute_Only specifies when true that the scrambled matrix is to be a permutation matrix only (i.e., has 1 nonzero entry in each row and col) and does not have any row or col additions performed.

A function Random_Natural that accepts a natural number upper limit and returns a "random" value between zero and the specified limit. The returned value is of type Natural.

To provide these inputs a series of other packages are provided which define and provide means for operating (i.e., build, initiate, evaluate, exponent, square root, inverse, add, subtract, multiply and divide) on polynomials and finite fields. These packages include binary_polynomials, which adds and defines the weight thereof; General Polynomials, which builds initials, obtains the Coeff and, obtaining the degree, evaluates ("<"); adds, subtracts, multiplies and divides the polynomials; Finite Field which provides for definition both in log form and polynomial form, and which provides for evaluation of ("<"), addition, subtraction, multiplication, division, square root exponential and inverse functions; and a Binary Matrices and Field Matrices packages, which perform certain operations including: RRE form, transposition, concatenation, identification, addition, multiplication, vector multiplication and finding the inverse of the matrice. The source code listing for each of these program packages is also attached hereto as Exhibit A.

FIG. 4, illustrates in function block form, the application of the Goppa Decoding Algorithm, illustrated at 23 in FIG. 3. As illustrated in FIG. 4, the input to the Goppa Decoding Algorithm is mSG combined with the error vector (e)P$^{-1}$. The first step is the calculation of the Goppa Syndrome S(x) modGx, which is carried out by package SYND, an instantiation of generic package Goppa-Syndrome, which computes the syndrome S of a received vector R for a Goppa code via the algorithm.

$$S(x) = SUM(i=0 \text{ to } _{n-1}) [R(i)*(1/x\text{-alpha}(i))] \mod G(x)$$

where G(x) is the Goppa Polynomial.

If S(x)=0 then no error vector is present and the remaining operations in FIG. 4 are terminated. As illustrated at 28, 29 since given mSG, with no errors present, mS may be recovered from mSG with a simple vector selection, without recourse to the remainder of the Goppa Decoding Algorithm.

The inverse of the syndrome is calculated, illustrated at 30 of FIG. 4, using, the subunit Invert-Poly. If only the zero location is in error, the first bit is flipped as indicated at 31, 32 and remainder of the Goppa Decoding Algorithm is omitted, since no errors remain, and mS may be recovered from mSG without recourse to the remainder of the Goppa Decoding Algorithm.

The next step, illustrated at 33 in FIG. 4 is to calculate the square root of T(x) +x, stopping when the degree of the remainder is less or equal to the floor of S/2, using the Goppa-Sqrt package, an instantiation of the Square_Root_Mod_Goppa package, yielding polynomial R(x).

Euclid's Algorithm is then performed on R(x) and the Goppa Polynomial using the FF-Euclids package, an instantiation of the Finite_Field_Euclids package as illustrated at 34, and sigma is computed from alpha and beta wherein $\sigma = \sigma^2 + x \, (\beta^2)$.

The roots of sigma are then found in the finite field, and identified as the error locations. If there are no roots for an input word with a non-zero syndrome, then an uncorrectable error has occurred. If there are more than S, degree of G, roots, an uncorrectable error has occurred. Each of these errors raises an exception, Exceeded_Error_Correction_Cap. The error locations in the error vector are then set to "1", and the error vector is added to the input word to get the corrected word.

If appropriate, the recovered error vector may also be passed to the secondary recovery channel for recovery of the secondary message or authenticate code as illustrated at 27 in FIG. 3. However, the error vector recovered at step 36 in FIG. 4 is not the same as the intentional error vector added at step 18 of FIG. 2, since the received vector was multiplied by the inverse of the permutation matrix p to form $rP^{-1}$ and therefore $eP^{-1}$ in step 22 of FIG. 3. It is therefore necessary to multiply the recovered error vector $eP^{-1}$ by the permutation matrix to obtain (e) the original intentional error vector.

Finally, apply $S^{-1}$ to obtain
$mSS^{-1} = m$
the original message.

The preceding description is quite compact and a full treatment of the Goppa Decoding Algorithm may be found in Chapter 8 of *The Theory of Information and Coding,* Vol 3 of *The Encyclopedia of Mathematics and Its Applications* published by Addison Wesley, Reading, Mass. 1977, the text and teachings of which are incorporated herein by reference thereto.

In summation, the essential elements of the present invention are as follows:

the t error correcting code generator matrix is 'scrambled' to produce an equivalent code which appears not to possess a fast decoding algorithm.

the scrambled generator matrix is made public.

anyone who wishes to correspond with the originator of the system encodes using the public generator matrix and standard matrix multiplication.

an error vector with at most t ones is intentionally added to the codeword to corrupt the encoded message and (a) additionally correct a limited number of communication channel errors in the case where the weight of e is less than t or (b) or carry a secondary message, such as an authentication code.

the receiver is able to unscramble the effect of the public generator matrix and rapidly decode.

anyone without the ability to unscramble the public generator matrix will be forced to use a hopelessly complex and time consuming general decoding method for binary linear codes.

Figure 5:
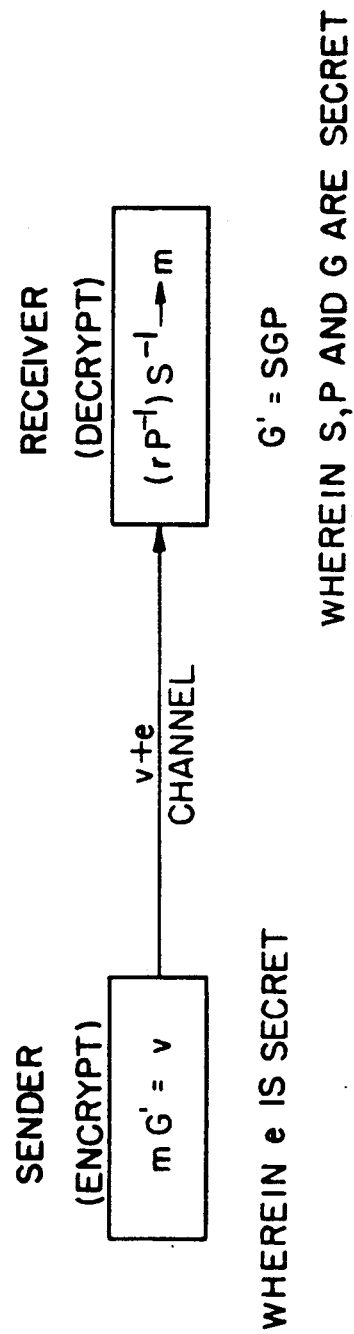
FIG. 5 is a paradigm of the encryption system of the present invention.

FIG. 5 is a paradigm which illustrates and summarizes the sequence of events described above in which matrix multiplication is used as part of the encryption process, and the inverses of S and P are used in the decrypting process which ultimately recovers the message m.

The present invention takes advantage of the inherent error correcting capability of linear codes to perform two (2) functions. The encryption algorithm is capable of performing correction of channel induced errors, as well as simultaneous data encryption. Suppose that $t = x + y$ is the error correction capability of the code where x, y are positive integers. Suppose further that in the encryption portion of the process, the sender uses an error vector with only x ones. Then as many as y additional errors may be inserted by the communication channel and still not exceed the error correction capability of the code. Thus, this approach permits simultaneous encryption for secrecy and encoding for error control. It is a property possessed by no other public key encryption process.

In order to solve some channel problems, a surprisingly small number of ones may be required. Consider the following situation. Many common carrier high speed data channels have a minimum requirement for "ones density". If too many consecutive zeros are transmitted, the receiver will begin to misframe databits and problems result. On most communication links, encryption devices, to the extent that they are destroyers of order and information, frequently simulate the behavior of random number generators. Occasionally, strings of zeros which are too long may be output by the encryption process. This error control based encryption process, however, handles the problem easily. Instead of using an error vector with t ones to corrupt data, use an error vector with t−1 ones. Set up a counter to count consecutive zeros, and if a too long string of zeros begins to develop, arbitrarily change a zero to a one. Since the number of errors in any given code word will still not exceed t, the communication process continues smoothly.

MATHEMATICAL STRUCTURE

The following section sets forth the formal definition of the desired, but restricted class of Goppa codes and derives certain basic results necessary to support the previously discussed cryptographic algorithm. A numerical example is also provided. For the purposes of the following examples, it is assumed that one skilled in the art is familiar with polynomial operations over a finite field.

Let $a_0, a_1, a_2, \ldots, a_{n-1}$ be an ordering of the $n=2^m$ elements of $GF(2^m)$. Let $G(x)$ be an irreducible polynomial over $GF(2^m)$ and let $v=(v_0, v_1, v_2, \ldots, v_{n-1})$ be a binary n-tuple. With this binary n-tuple, associate the following rational form $$Q(x) = \sum_{i=0}^{n-1} \frac{v_i}{x + a_i}$$

First, define V to be set of all binary n-tuples, v, such that $$Q(x) = \sum_{i=0}^{n-1} \frac{v_i}{x + a_i} \equiv 0 \bmod G(x).$$

Note that $(0,0,0, \ldots, 0) \in V$, so that V is not empty.

Theorem: V is a linear code.

Proof: Suppose $u,v \in V$. Then $$\sum_{i=0}^{n-1} \frac{u_i}{x + a_i} \equiv 0 \bmod G(x)$$

and $$\sum_{i=0}^{n-1} \frac{v_i}{x + a_i} \equiv 0 \bmod G(x),$$

which implies that $$\sum_{i=0}^{n-1} \frac{(u_i + v_i)}{x + a_i} \equiv 0 \bmod G(x)$$

so that $(u+v) \in V$.

Since V is a closed subset of the set of all binary n-tuples, it is a luinear code. Q.E.D.

V is the Goppa code used in the encryption system of the present invention. It should be noted that the Goppa codes of the present invention are defined using only irreducible polynomials, $G(x)$, and thus constitute a restricted class of such codes.

Theorem: If $G(x)$ is irreducible and $\deg G(x) = s \geq 2$, then the associated Goppa code, V, has minimum distance $d_{min} \geq 2s+1$.

Proof: Let $v = (v_0, v_1, \ldots, v_{n-1}) \in V$ be a non-zero code word. Then $$Q(x) = \sum_{i=0}^{n-1} \frac{v_i}{x + a_i} = \sum_{j=1}^{k} \frac{v_{ij}}{x + a_{ij}} \equiv 0 \bmod G(x)$$

where $v_{i1}, v_{i2}, \ldots, V_{ik}$ are the non-zero components of v.

Define $$f(x) = \prod_{j=1}^{k} (x + a_{ij})$$

and take the formal derivative of $f(x)$:

$$f'(x) = \sum_{j=1}^{k} \prod_{\substack{l=1 \\ l \neq j}}^{k} (x + a_{il}).$$

Then:

$$Q(x) = \frac{f'(x)}{f(x)}$$

and $$\frac{f'(x)}{f(x)} \equiv 0 \bmod G(x).$$

But this implies that $G(x)$ divides $f'(x)$. Now $f'(x)$ contains only even powers of x, since the field has characteristic 2.

Thus $f'(x) = g^2(x)$ for some $g(x)$ and therefore $G(x)$ divides $g^2(x)$.

We claim that $G(x)$ also divides $g(x)$. Suppose it does not. Then

$g \cdot c \cdot d \cdot (g(x), G(x)) = 1$ and we may write
$a(x)g(x) + b(x)G(x) = 1$ for some $a(x), b(x)$.

This implies that $$a(x)g^2(x) + b(x)G(x)g(x) = g(x)$$

but this is a contradiction. Thus $G(x)$ divides $g(x)$. But if $G(x)$ divides $g(x)$ and $f'(x) = g^2(x)$, then $G^2(x)$ divides $f'(x)$.

But $\deg G^2(x) = 2\deg G(x) \leq \deg f'(x) < \deg f(x)$ so
$2\deg G(x) + 1 \leq \deg f(x).$ Now it is noted that $\deg f(x)$ = number of non-zero components of $v$
= $w(v)$, the weight of $v$.

Therefore $2\deg G(x) + 1 \leq d_{min}$. Q.E.D.

In accordance with the present invention an efficient decoding algorithm for these Goppa codes may be constructed as follows:

Let v be the binary code word transmitted through a noisy channel, and let $r = v + e$ be the received word, where
v = binary n-tuple code word,
r = received word,
e = error vector of weight $= s, s = \deg G(x)$,
and addition is modulo 2.

Next define the syndrome for the above received word, r, to be $$S(x) = \sum_{i=0}^{n-1} \frac{r_i}{x + a_i} = \sum_{i=0}^{n-1} \frac{(v_i + e_1)}{x + a_i} \bmod G(x)$$

$$= \sum_{i=0}^{n-1} \frac{e_i}{x + a_i} \bmod G(x)$$

since v is a code word and $$\sum_{i=0}^{n-1} \frac{v_i}{x + a_i} \equiv 0 \bmod G(x).$$

Now $e = (e_0, e_1, \ldots, e_{n-1})$ is an error vector of weight at most s. Suppose the s non-zero components of e correspond $$a_{i1}, a_{i2}, a_{i3}, \ldots, a_{i5}$$

Next we define the error locator polynomial, $$\sigma(x) = \prod_{j=1}^{s} (x + a_{ij}).$$

Then calculate the formal derivative $$\sigma'(x) = \sum_{k=1}^{s} \prod_{\substack{j=1 \\ k \neq j}}^{s} (x + a_{ij}).$$

But now we may write $$\begin{aligned} S(x)\sigma(x) &= \left( \sum_{j=1}^{s} \frac{1}{x + a_{ij}} \right) \cdot \prod_{j=1}^{s} (x + a_{ij}) \\ &= \sum_{k=1}^{s} \prod_{\substack{j=1 \\ k \neq j}}^{s} (x + a_{ij}) \\ &\equiv \sigma'(x) \bmod G(x) \end{aligned}$$

and
$$S(x)\sigma(x) \equiv \sigma'(x) \bmod G(x).$$

Now $$\sigma(x) = \prod_{j=1}^{s} (x + a_{ij})$$

has degree s. It is composed of both even and odd powers of x.

Thus it may be written, $$\begin{aligned} \sigma(x) &= \text{(even powers)} + \text{(odd powers)} \\ &= \text{(even powers)} + x\text{(even powers)} \\ &= \alpha^2(x) + x \cdot \beta^2(x) \text{ for some } \alpha(x), \beta(x), \end{aligned}$$

where $$\deg \alpha(x) \leq s/2, s = \deg G(x)$$

$$\deg \beta(x) \leq \frac{s-1}{2}.$$

In this case, $\sigma'(x) = \beta^2(x)$.

Next, it is necessary to find $\alpha(x)$ and $\beta(x)$, and thus the roots of $\sigma(x)$. To begin this process, one next determines the inverse of $S(x)$, assuming that $S(x) \neq 0$.

Since $$\deg S(x) \leq s - 1, \text{ and } G(x) \text{ is irreducible g.c.d. } (S(x), G(x)) = 1$$

and there exist $T(x)$ and $U(x)$ such that $$T(x)S(x) + U(x)G(x) = 1$$

or equivalently $$T(x)S(x) \equiv 1 \bmod G(x).$$

If it is required that $\deg T(x) < \deg G(x)$ and $\deg U(x) < \deg S(x)$, then $T(x)$ and $U(x)$ are unique.

Next $a(x)S(x) \equiv \sigma'(x) \bmod G(x)$ implies that
$a(x)S(x)T(x) \equiv \sigma'(x)T(x) \bmod G(x)$
which upon substitution implies $$a^2(x) + x \beta^2(x) \equiv \beta^2(x)T(x) \bmod G(x)$$

and $$[T(x) + x]\beta^2(x) \equiv a^2(x) \bmod G(x)$$

It is then necessary to consider two cases: $T(x) = x$, $T(x) \neq x$.

Case 1) $T(x) = x$. Then $\sigma(x) = x$ and we have a solution to $S(x)\sigma(x) \equiv \sigma'(x) \bmod G(x)$.

Case 2) $T(x) \neq x$. This is the more interesting and general case. In what follows, assume that $T(x) \neq x$.

By choosing the correct value of the intentional error vector to possess more than one (1) error, it is possible to disregard Case 1, and go directly to Case 2.

There is a unique polynomial $R(x)$ such that $$R^2(x) \equiv T(x) + x \bmod G(x)$$

Consider the set of all polynomials of degree less than the degree of $G(x)$, $\{P_1(x), P_2(x), \ldots\}$.

Since $G(x)$ is irreducible, they constitute a field. Consider the "squares" of all such polynomials, again reduced modulo $G(x)$, $\{P^2_1(x), P^2_2(x), \ldots\}$.

Clearly $\{P_1(x), P_2(x), \ldots\} = \{P^2_1(x), P^2_2(x), \ldots\}$, and every element has a unique square root.

Thus, every element of degree less than s, including $T(x) + x$, can be represented as the square of a unique polynomial.

Let $R^2(x) \equiv T(x) + x \bmod G(x)$.

But this implies that $$\beta^2(x)R^2(x) \equiv a^2(x) \bmod G(x)$$

and $$\beta(x)R(x) \equiv a(x) \bmod G(x).$$

In order to determine $o(x) = \sigma^2(x) + \beta^2(x)$ we require an efficient procedure for finding $\sigma(x)$ and $\beta(x)$ given $R(x)$ and $G(x)$. For this the Euclidean algorithm is used.

Given two polynomials, such as $G(x)$ and $R(x)$, with $\deg G(x) \geq \deg R(x)$, repeated divisions are made:

$$G(x) = q_1(x)R(x) + r_1(x) \quad \deg r_1(x) < \deg R(x)$$
$$R(x) = q_2(x)r_1(x) + r_2(x) \quad \deg r_2(x) < \deg r_1(x)$$
$$r_1(x) = q_3(x)r_2(x) + r_3(x) \quad \deg r_3(x) < \deg r_2(x)$$
etc. etc.

The following recurrence relations may now be defined:

$$r_{i-2}(x) = q_i(x)r_{i-1}(x) + r_i(x) \quad deg\ r_i(x) < deg\ r_{i-1}(x)$$

$$s_i(x) = s_{i-2}(x) - q_i(x)s_{i-1}(x)$$

$$t_i(x) = t_{i-2}(x) - q_i(x)t_{i-1}(x)$$

With the following initial conditions $$s_{-1}(x) = 1 \quad t_{-1}(x) = 0 \quad r_{-1}(x) = G(x)$$

$$s_0(x) = 0 \quad t_0(x) = 1 \quad r_0(x) = R(x).$$

It is noted that several properties are associated with these recurrence relations.

Lemma 1: $s_i(x)t_{i-1}(x) - s_{i-1}(x)t_i(x) = (-1)^{i+1}, 0 \leq i \leq n + 1.$
Proof (by induction)
$i = 0$: $s_0(x)t_{-1}(x) - s_{-1}(x)t_0(x) =$ $$0 \cdot 0 - 1 \cdot 1 = -1 = (-1)^{0+1}.$$

assume for $i$:
prove for $i + 1$: $s_{i+1}(x)t_i(x) - s_i(x)t_{i+1}(x) = (-1)^{(i+1)+1}.$
But
$s_{i+1}(x) = s_{i-1}(x) - q_{i+1}(x)s_i(x)$
$t_{i+1}(x) = t_{i-1}(x) - q_{i+1}(x)t_i(x).$
Thus
$[s_{i-1}(x) - q_{i+1}(x)s_i(x)]t_i(x) - s_i(x)[t_{i-1}(x) - q_{i+1}(x)t_i(x)]$ Q.E.D.
$=$
$s_{i-1}(x)t_i(x) - s_i(x)t_{i-1}(x) =$
$-(s_i(x)t_{i-1}(x) - s_{i-1}(x)t_i(x)) = -(-1)^{i+1} = (-1)^{(i+1)+1}.$
Lemma 2: $s_i(x)G(x) + t_i(x)R(x) = r_i(x), -1 \leq i \leq n + 1.$
Proof(by induction)
$i = -1$: $s_{-1}(x)G(x) + t_{-1}(x)R(x) =$ $$1 \cdot G(x) + 0\ R(x) = G(x) = r_{-1}(x).$$

assume for $i$:
prove for $i + 1$: $s_{i+1}(x)G(x) + t_{i+1}(x)R(x) = r_{i+1}(x).$
Substituting for
$s_{i+1}(x), t_{i+1}(x)$ and $r_{i+1}(x)$ we get
$s_{i-1}(x)G(x) - q_{i+1}(x)s_i(x)G(x) + t_{i-1}(x)R(x) - q_{i+1}(x)t_i(x)R(x) =$
$[s_{i-1}(x)G(x) + t_{i-1}(x)R(x)] - q_{i+1}(x)[s_i(x)G(x) + t_i(x)R(x)] =$
(by inductive assumption)
$[r_{i-1}(x)] - q_{i+1}[r_i(x)] = r_{i+1}(x).$ Q.E.D.
Lemma 3: $deg\ t_i(x) + deg\ r_{i-1}(x) = deg\ G(x), 0 \leq i \leq n + 1.$
Proof(by induction)
Before beginning the formal inductive proof, one may prove a small result which will be needed in the inductive step.
Using the relation for $t_i(x)$,
note that
$t_i(x) = t_{i-2}(x) - q_i(x)t_{i-1}(x)$, so that
$t_0(x) = 1$
$t_1(x) = t_{-1}(x) - q_1(x)t_0(x) = 0 - q_1(x)$
$t_2(x) = t_0(x) - q_2(x)t_1(x) = 1 + q_2(x)q_1(x)$
$t_3(x) = t_1(x) - q_3(x)t_2(x) = -q_1(x) - q_3(x) - q_3(x)q_2(x)q_1(x)$
.
.
etc.
Thus, in general, $$deg\ t_i(x) = \sum_{j=1}^{i} deg\ q_j(x).$$

$i = 0$:
$deg\ t_0(x) + deg\ r_{-1}(x) =$
$0 + deg\ G(x) = deg\ G(x).$
assume for $i$:
prove for $i + 1$: $deg\ t_{i+1}(x) + deg\ r_i(x) = deg\ G(x).$
Substituting, one finds
$deg\ t_{i+1}(x) = deg[t_{i-1}(x) - q_{i+1}(x)t_i(x)] = deg\ q_{i+1}(x)t_i(x)$
since $$deg\ t_{i-1}(x) \sum_{j=1}^{i-1} deg\ q_j(x),$$

$$deg\ q_{i+1}(x)t_i(x) = \sum_{j=1}^{i+1} deg\ q_j(x)$$

and $$\sum_{j=1}^{i-1} deg\ q_j(x) \leq \sum_{j=1}^{i+1} deg\ q_j(x).$$

Substituting again, $$deg\ r_i(x) = deg\left[\frac{r_{i-1}(x) - r_{i+1}(x)}{q_{i+1}(x)}\right] = deg\ \frac{r_{i-1}(x)}{q_{i+1}(x)}.$$

Thus
$deg\ t_{i+1}(x) + deg\ r_i(x) =$ $$[deg\ q_{i+1}(x)t_i(x)] + \left[deg\ \frac{r_{i-1}(x)}{q_{i+1}(x)}\right] =$$

$$[deg\ q_{i+1}(x) + deg\ t_i(x)] + [deg\ r_{i-1}(x) - deg\ q_{i+1}(x)] =$$

$$deg\ t_i(x) + deg\ r_{i-1}(x) = deg\ G(x), \text{ by hypothesis}$$

Finally the following important lemma may be proved.
Lemma 4 With $G(x), R(x)$ defined as above, there exists a unique integer $i, 0 \leq i \leq n$ such that $$deg\ t_i(x) \leq s - s/2 - 1, \quad deg\ G(x) = s$$

$$deg\ r_i(x) \leq s/2 \quad \quad x = \text{greatest integer function}$$

Proof
Recall that both $deg\ r_i(x)$ and $deg\ t_i(x)$ are strictly decreasing and increasing sequences, respectively. One may define i by requiring that $$deg\ r_{i-1}(x) \leq s/2 + 1$$

$$deg\ r_i(x) \leq s/2.$$

There can be only one such value for i. Then, by Lennna 3

$$deg\ t_i(x) + deg\ r_{i-1}(x) = deg\ G(x0 = s,$$

which implies that $$deg\ t_i(x) \leq s. \ s/2 - 1$$

$$deg\ t_{i+1} \leq s. \ s/2.$$

Again, there can be only one such value for i. Q.E.D.
With the forgoing one may now prove the most important result.
Theorem
Given the equivalence relation $$\beta(x)R(x) = \alpha(x) mod G(x), \quad deg\ \beta(x) \leq \frac{s-1}{2}$$

$$deg\ \alpha(x) \leq s/2$$

there is a unique i such that $$\beta(x) = t_i(x)$$

$$\alpha(x) = r_i(x).$$

Proof

One separates the proof into two parts. (Part 1) Suppose that one assumes, for the moment, that $$\beta(x) = t_i(x)$$
$$\alpha(x) = r_i(x), \text{ for some } i.$$

It may be shown that i is unique.

Re-write the restrictions on the degrees of the polynomials $\alpha(x)$ and $\beta(x)$ using the greatest integer functions:

$$\deg \alpha(x) \leq \frac{s}{2}$$

$$\deg \beta(x) \leq \frac{s-1}{2}$$

But $$\frac{s}{2} + \frac{s-1}{2} = s - 1,$$

so that $$\frac{s-1}{2} = s - \frac{s}{2} - 1$$

and it is seen that $$\deg \alpha(x) \leq s/2 \quad \text{ps}$$

$$\deg \beta(x) \leq x - s/2 - 1,$$

the upper bounds from Lemma 4.

Thus, on the assumption that some index i exists such that $$\beta(x) = t_i(x)$$

$$\alpha(x) = r_i(x), \text{ the index is unique}$$

since $$\deg \beta(x) = \deg t_i(x) \leq s - s/2 - 1$$

$$\deg \alpha(x) = \deg r_i(x) \leq s/2.$$

(Part 2) Using Lemma 2 and $\beta(x)R(x) - \alpha(x) \mod G(x)$ one may write the following equations $$s_i(x)G(x) + t_i(x)R(x) = r_i(x) \quad (1)$$
$$s(x)G(x) + \beta(x)R(x) = \alpha(x), \text{ for some } s(x).$$

Multiplying by $\beta(x)$ and $t_i(x)$ respectively one obtains $$\beta(x)s_i(x)G(x) + \beta(x)t_i(x)R(x) = \beta(x)r_i(x) \quad (2)$$
$$t_i(x)s(x)G(x) + t_i(x)\beta(x)R(x) = t_i(x)\alpha(x).$$

But this implies that $$\beta(x)s_i(x)G(x).t_i(x)s(x)G(x) = \beta(x)r_i(x).t_i(x)\alpha(x)$$

or, equivalently $$\beta(x)r_i(x) \equiv t_i(x)\alpha(x) \mod G(x).$$

Examining the degrees of both sides of this equivalence shows $$\deg \beta(x) + \deg r_i(x) \leq s - 1 + s/2 < s$$

$$\deg t_i(x) + \deg \alpha(x) \leq s - 2 \ 1 + s2^\circ < s,$$

so the equivalence is an equality:

$$\beta(x)r_i(x) = t_i(x)\alpha(x).$$

Substituting back into the same pair of equations (2) we see that this implies $$\beta(x)s_i(x)G(x) = t_i(x)s(x)G(x)$$

and finally $$\beta(x)s_i(x) = t_i(x)s(x).$$

Now from Lemma 1 it is known that g.c.d.$(s_i(x),t_i(x))=1$ which implies that $$s(x) = \lambda(x)s_i(x)$$

$$\beta(x) = \lambda(x)t_i(x) \text{ for some } \lambda(x).$$

Substituting into the original pair of equations (1) we have $$s_i(x)G(x) + t_i(x)R(x) = r_i(x)$$

$$\lambda(x)s_i(x)G(x) + \lambda(x)t_i(x)R(x) = \alpha(x).$$

Multiplying the top equation by $\lambda(x)$ and comparing it may be seen $$\alpha(x) = \lambda(x)r_i(x).$$

Thus, it may be finally shown that $$\beta(x) = \lambda(x)t_i(x)$$

$$\alpha(x) = \lambda(x)r_i(x) \text{ for some } \lambda(x).$$

Recall that $\sigma(x)$ is the Goppa code error locator polynomial, and $$\sigma(x) = \alpha^2(x) + x\beta^2(x)$$
$$= \lambda^2(x)[r_i^2(x) + xt_i^2(x)]$$

after substitution.

But, by its construction, $\sigma(x)$ has only simple zeros. Thus $\lambda(x)$ is a constant, which may taken to be 1 for ease of computation. Q.E.D.

In summary, to decode, one performs the following steps:
1. Compute the syndrome, $S(x)$.
2. Compute $T(x)$ such that $T(x)S(x) \equiv 1 \mod G(x)$.
   if $T(x) = x$, we are finished.
   if $T(x) \neq x$, continue.
3. Compute $R(x)$ such that $R^2(x) \equiv T(x) + x \mod G(x)$.
4. Solve $\beta(x)R(x) \equiv \sigma(x) \mod G(x)$ using Euclid's algorithm. Stop when $$\deg r_i(x) \leq s/2$$

$$\deg r_{i-1}(x) \leq s/2 + 1$$

and set $$a(x) = r_t(x)$$

$$\beta(x) = t_t(x).$$

Find the roots of
$\sigma(x) = \sigma^2(x) + x\ \beta^2(x).$

EXAMPLE 1

In order to give a concrete demonstration of the encryption and decryption processes, consider the following example.

Let $G(x) = x^2 + x + 1$ be the irreducible Goppa polynomial over $GF(2^3)$, where the ordering of the field elements is given by $$0, \sigma^0, \sigma^1, \sigma^2, \sigma^3, \sigma^4, \sigma^5, \sigma^6$$

and $\sigma$ is a root of the primitive polynomial $x^3 + x + 1$. The Goppa code defined by these conditions has $n = 8$, $t = 2$ and $k = 2$. There are only four code words.

It can be shown that a generator matrix for this code is given by $$G = \begin{pmatrix} 1 & 1 & 1 & 1 & 0 & 1 & 0 & 0 \\ 1 & 1 & 0 & 0 & 1 & 0 & 1 & 1 \end{pmatrix}$$

Next, this matrix is scrambled by forming $G' = SGP$, where S is nonsingular and P is a permutation matrix.

The following matrices are:

$$S = \begin{pmatrix} 1 & 0 \\ 1 & 1 \end{pmatrix} \text{ and } P = \begin{pmatrix} 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 0 & 0 & 0 & 0 & 0 & 0 & 1 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 0 & 0 & 1 & 0 & 0 \end{pmatrix}$$

Then it is seen that $$G' = \begin{pmatrix} 1 & 0 & 1 & 1 & 0 & 0 & 1 & 1 \\ 1 & 1 & 0 & 0 & 1 & 1 & 1 & 1 \end{pmatrix}$$

From among the four possible message 2-tuples, choose $m = (10)$ and form the code word $$mG' = (10110011) = v.$$

Since the code is capable of correcting up to 2 errors, select an error vector of weight 2. Let $e = (10010000)$ and form the cryptogram
$r = v + e = (10110011) + (10010000) = (00100011).$ Suppose that r is now transmitted through a channel and that no additional channel errors are inserted At the receiving end, one begins the decrypting process by applying $p^{-1}$.

Form $rP^{-1} = (10010100)$, and then begin the Goppa decoding procedure.

Then form the syndrome $$S(x) =$$

$$\frac{1}{x+0} + \frac{1}{x+\alpha^2} + \frac{1}{x+\alpha^4} \equiv \alpha^6 x + \alpha^5 \bmod x^2 + x + 1.$$

Find T(x) such that $$T(x)S(x) \equiv 1 \bmod x^2 + x + 1.$$

It can be seen that $$T(x) \equiv a^5 x + a^0 \equiv a^5 x + 1.$$

Next, find R(x) such that $$R^2(x) \equiv T(x) + x \equiv a^4 x + 1 \bmod x^2 + x + 1.$$

It can be seen that $$R(x) \equiv a^2 x + a^6.$$

Next, solve for $\alpha(x)$ and $\beta(x)$ in the congruence relation $$\beta(x)(a^2 x + a^6) \equiv a(x) \bmod x^2 + x03\ 1.$$

Which finds that $$a(x) \equiv a^2 x + a^6$$
$$\beta(x) \equiv 1$$

and thus $$\sigma(x) = a^2(x) + x\beta^2(x)$$
$$= a^4 x^2 + x + a^5.$$

The roots of $\sigma(x)$ are seen to be:

$$x = a^0$$

$$x = a^1$$

Thus $$\begin{aligned} mSG &= (10010100) + (01100000) \\ &= (11110100) \end{aligned}$$

which is the corrected codeword.
But then it is straightforward to verify that $$mS = (10)$$

and thus, $$m = mss^{-1} = (10),$$

the original message vector.

A natural by-product of the decoding process is the permuted error vector $$e' = (01100000).$$

The original error vector may be obtained by forming the product $$e'P = e = (10010000).$$

Thus, it is clear that the original error vector itself is recoverable and can be used as a carrier of information.

I claim:

1. A method of transmitting a digital cryptogram over a communications channel by means of a public key algorithm, said method comprising:
    (a) constructing a first generator matrix with a preselected finite field and an irreducitble Goppa polynomial, said polynomial providing a degree s error correcting capability,
    (b) constructing a scrambled generator matrix by matrix multiplication, said scrambled generator matrix being the product of a non-singular matrix, said first generator matrix and a permutation matrix,
    (c) converting plaintext message to be sent to binary form and blocking the message to a predetermined size, said size corresponding to the number of rows in said scrambled generator matrix, said blocked binary message forming a message vector,
    (d) encoding the message vector with the scrambled generator matrix using matrix multiplication to form a code vector,
    (e) adding a preselected error vector to the code vector in component wise fashion using modulo 2 arithmetic, to generate a cryptogram,
    (f) transmitting said cryptogram over a communications channel, said channel having an channel error probability, wherein the combined predetermined error vector and the channel error vector do not exceed the degree s error correcting capability.

2. A method of decoding a digital cryptogram, when the cryptogram was created with a public key scrambled generator matrix, said scrambled matrix being the product of a permutation matrix, a non-singular matrix, and a generator matrix formed from an irreducible Goppa polynomial, said method comprising:
    (a) multiplying a received cryptogram by the inverse of the permutation matrix used in creating the public key scrambled matrix to obtain a permuted form of the received cryptogram,
    (b) apply a Goppa decoding algorithm to the permuted form of the received cryptogram to find mS and a permuted error vector, wherein m represents the original message encoded and S represents the non-singular matrix
    (c) multiply mS by the inverse of the non-singular matrix to derive m, a binary form of a plaintext message
    (d) multiply the permuted error vector by the permutation matrix to derive a preselected error vector.

3. A method of transmitting a digital cryptogram over a communications channel as claimed in claim 1, wherein an authentication code is selected and added to the message as the preselected error vector.

4. A method of decoding a digital cryptogram as claimed in claim 2, wherein the received error vector is used to authenticate the sender of the cryptogram.

5. A method of transmitting a digital cryptogram over a communications channel as claimed in claim 1, wherein the communications channel is further defined to be a common carrier data link, said method further comprising the step of inserting a preselected error in any block of the cryptogram that exceeds a predetermined ones density requirement.

6. A method of transmitting a digital cryptogram over a communications channel as claimed in claim 1, wherein the preselected error vector is chosen from an extended heavyweight error pattern.

7. A method of decoding a digital cryptogram as claimed in claim 2, wherein e is further defined as a heavyweight error pattern.

8. A method of transmitting a digital cryptogram over a communications channel by means of a public key algorithm, said method comprising:
    (a) constructing a first generator matrix with a preselected finite field and an irreducible Goppa polynomial, said polynomial providing a degree s error correcting capability,
    (b) constructing a scrambled generator matrix by matrix multiplication, said scrambled generator matrix being the product of a non-singular matrix, said first generator matrix and a permutation matrix,
    (c) converting plaintext message to be sent to binary form and blocking the message to a predetermined size, said size corresponding to the number of rows in said scrambled generator matrix, said blocked binary message forming a message vector,
    (d) encoding the message vector with the scrambled generator matrix using matrix multiplication to form a code vector,
    (e) adding a preselected heavy weight error vector to the code vector in component wise fashion using modulo 2 arithmetic, to generate a cryptogram.

9. A method of transmitting a digital cryptogram over a communications channel as claimed in claim 1, wherein the communications channel is further defined to be a common carrier data link, said method further comprising the step of inserting a preselected error in any block of the cryptogram that exceeds a predetermined ones density requirement.

10. A method of transmitting a digital cryptogram over a communications channel by means of a public key algorithm, said method comprising:
    (a) constructing a first generator matrix with a preselected finite field and an irreducible Goppa polynomial, said polynomial providing a degree s error correcting capability,
    (b) constructing a scrambled generator matrix by matrix multiplication, said scrambled generator matrix being the product of a non-singular matrix, said first generator matrix and a permutation matrix,
    (c) converting plaintext message to be sent to binary form and blocking the message to a predetermined size, said size corresponding to the number of rows in said scrambled generator matrix, said blocked binary message forming a message vector,
    (d) encoding the message vector with the scrambled generator matrix using matrix multiplication to form a code vector,
    (e) adding a preselected heavy weight error vector to the code vector in component wise fashion using modulo 2 arithmetic, to generate a cryptogram, said error vector including a secondary message.

11. A method of decoding a digital cryptogram, when the cryptogram was created with a public key scrambled generator matrix, said scrambled matrix being the product of a permutation matrix, a non-singular matrix, and a generator matrix formed from an irreducible Goppa polynomial, said method comprising:
    (a) multiplying a received cryptogram by the inverse of the permutation matrix used in creating the public key scrambled matrix to obtain a permuted form of the received cryptogram, (b) apply a Goppa decoding algorithm to the permuted form of the received cryptogram to find mS and a permuted error vector, wherein m represents the original message encoded and S represents the non-singular matrix, (c) multiply mS by the inverse of the non-singular matrix to derive m, a binary form of a plaintext message, (d) multiply the permuted error vector by the permutation matrix to derive a secondary message.

12. A method of transmitting a digital cryptogram over a communications channel as claimed in claim 10, wherein an authentication code is selected and added to the message as a component of the secondary message.

13. A method decoding a digital cryptogram as claimed in claim 11, wherein the received error vector is used to authenticate the sender of the cryptogram.

14. A method of transmitting a digital cryptogram over a communications channel as claimed in claim 10, wherein the communications channel is further defined to be a common carrier data link, said method further comprising the step of inserting a preselected error in any block of the cryptogram that exceeds a predetermined ones density requirement.

* * * * *

UNITED STATES PATENT AND TRADEMARK OFFICE
CERTIFICATE OF CORRECTION

PATENT NO. : 5,054,066

DATED : October 1, 1991

INVENTOR(S) : Justus Riek, et al.

It is certified that error appears in the above-identified patent and that said Letters Patent is hereby corrected as shown below:

Column 2, line 14: delete "0"

Column 3, line 63: "Ek(X)=Y" should read as --$E_k(X)=Y$--

Column 3, line 65: "Dk(Y)=X" should read as --$D_k(Y)=X$--

Column 5, line 44: "differ" should read as --differ.--

Column 7, line 40: "e=e" should read as --e' = e--

Column 9, line 30: Coeff$_{13}$" should read as --Coeff--

UNITED STATES PATENT AND TRADEMARK OFFICE
CERTIFICATE OF CORRECTION

PATENT NO. : 5,054,066  
DATED : October 1, 1991  
INVENTOR(S) : Justus Riek, et al.

It is certified that error appears in the above-identified patent and that said Letters Patent is hereby corrected as shown below:

Column 14, line 58: "weight =" should read as --weight $\leqq$ --

Column 18, line 40: "Lenna" should read as --Lemma--

Column 20, line 65: "s/2" should read as -- $\lfloor s/2 \rfloor$ --

Column 20, line 67: "s/2" should read as -- $\lfloor s/2 \rfloor$ --

Column 22, line 26: " + x03 1." should read as -- + x + 1.--

Signed and Sealed this

Fourth Day of January, 1994

Attest:

*Attesting Officer*

BRUCE LEHMAN

*Commissioner of Patents and Trademarks*